United States Patent [19]

Gitlis et al.

[11] Patent Number: 5,539,387
[45] Date of Patent: Jul. 23, 1996

[54] EARTHQUAKE SENSOR

[75] Inventors: Meir Gitlis, Bnei Atarot; Alon Zivon, Herzliya, both of Israel

[73] Assignee: E.Q. Earthquake, Ltd., Ramat Gan, Israel

[21] Appl. No.: 397,789

[22] Filed: Mar. 3, 1995

[30] Foreign Application Priority Data

Jun. 1, 1994 [IL] Israel ......................................... 109851

[51] Int. Cl.⁶ ................................................. G08B 21/00
[52] U.S. Cl. ........................... 340/690; 340/540; 340/601; 340/689
[58] Field of Search ..................................... 340/690, 689, 340/540, 601

[56] References Cited

U.S. PATENT DOCUMENTS

| | | | |
|---|---|---|---|
| 4,086,807 | 5/1978 | Nakada | 73/652 |
| 4,262,289 | 4/1981 | Rivera | 340/690 |
| 4,297,690 | 10/1981 | Baker | 340/690 |
| 4,358,757 | 11/1982 | Perini | 340/540 |
| 4,359,722 | 11/1982 | Valdez et al. | 340/540 |
| 4,484,186 | 11/1984 | Wood et al. | 340/689 |
| 4,662,225 | 5/1987 | Koh et al. | 73/655 |
| 4,689,997 | 9/1987 | Windisch | 73/652 |
| 4,764,761 | 8/1988 | Maguire, III | 340/690 |
| 4,764,762 | 8/1988 | Almour | 340/690 |
| 4,789,922 | 12/1988 | Cheshire | 362/158 |
| 4,841,288 | 6/1989 | Addicks | 340/690 |
| 4,904,943 | 2/1990 | Takahashi | 324/344 |
| 4,945,347 | 7/1990 | Perry | 340/689 |
| 4,978,948 | 12/1990 | Samen | 340/690 |
| 4,980,644 | 12/1990 | Todorov | 324/345 |
| 5,001,466 | 3/1991 | Orlinsky et al. | 340/690 |
| 5,101,195 | 3/1992 | Caillat et al. | 340/690 |
| 5,111,543 | 5/1992 | Epshetsky et al. | 5/424 |
| 5,144,598 | 9/1992 | Engdahl et al. | 367/181 |
| 5,241,175 | 8/1993 | Yasunaga | 324/323 |
| 5,248,959 | 9/1993 | Chern | 340/601 |
| 5,278,540 | 1/1994 | Caban-Domenech | 340/601 |

*Primary Examiner*—Glen Swann
*Attorney, Agent, or Firm*—Woodcock Washburn Kurtz Mackiewicz & Norris

[57] ABSTRACT

An earthquake sensor includes a base support, a first element pivotably supported onto the base support at a first pivot location, a second element pivotably supported onto the first element at a second pivot location and sensor apparatus operative to sense earthquake actuated vibration of the second element and to provide an output indication thereof.

4 Claims, 5 Drawing Sheets

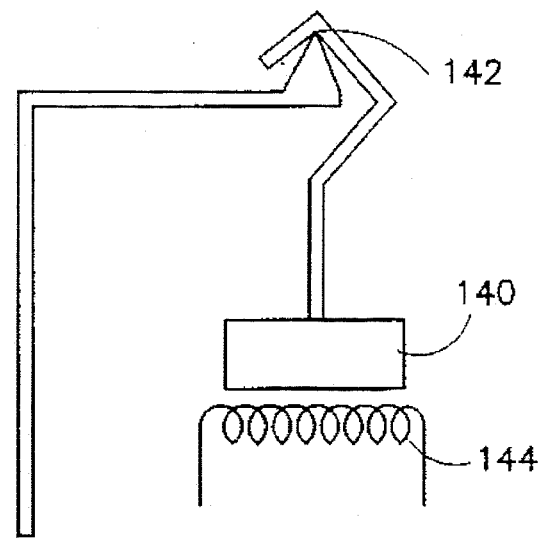
FIG. 10
FIG. 11
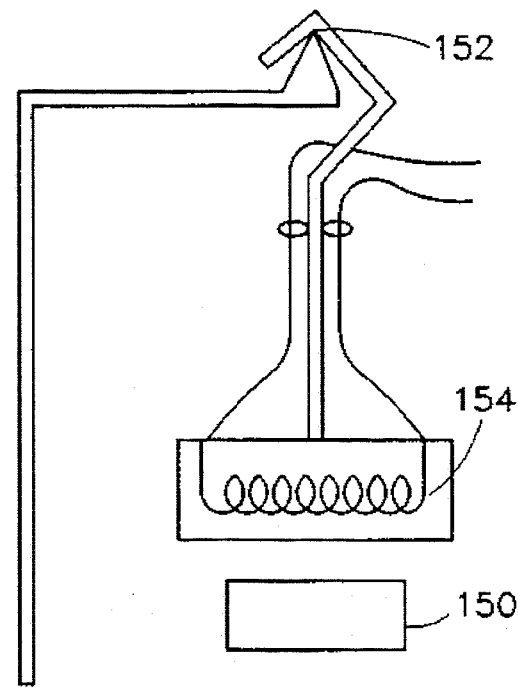

EARTHQUAKE SENSOR

FIELD OF THE INVENTION

The present invention relates to earthquake sensors and alarms generally.

BACKGROUND OF THE INVENTION

Various types of earthquake sensors are known in the patent literature. The following U.S. Patents are believed to represent the state of the art: U.S. Pat. Nos. 4,086,807; 4,262,289; 4,297,690; 4,358,757; 4,484,186; 4,662,225; 4,689,997; 4,764,761; 4,764,762; 4,789,922; 4,841,288; 4,904,943; 4,945,347; 4,978,948; 4,980,644; 5,001,466; 5,101,195; 5,248,959; 5,278,540.

SUMMARY OF THE INVENTION

The present invention seeks to overcome the disadvantages of the prior art attempts and provides a relatively inexpensive and reliable earthquake sensor.

There is thus provided in accordance with a preferred embodiment of the present invention an earthquake sensor comprising a base support, a first element pivotably supported onto the base support at a first pivot location; a second element pivotably supported onto the first element at a second pivot location and sensor apparatus operative to sense earthquake actuated vibration of the second element and to provide an output indication thereof.

Preferably alarm apparatus is provided, responsive to the output indication, for providing an audio alarm indicating the occurrence of an earthquake.

In accordance with a preferred embodiment of the present invention the sensor apparatus is responsive to relative displacement of the first and second elements.

Further in accordance with a preferred embodiment of the present invention, the sensor apparatus is located intermediate the first and second pivot locations.

In accordance with a preferred embodiment of the present invention, the sensor apparatus comprises piezoelectric apparatus.

Further in accordance with a preferred embodiment of the present invention there is provided an adjusting device, the adjusting device being operative to change the amplitude of earthquake activated vibration of the second element required to provide output indication from the sensor apparatus.

Still further in accordance with a preferred embodiment of the present invention, the sensor apparatus is responsive to frequencies induced in the base support in the range substantially between 0.1 Hz and 10 Hz to provide the output indication.

BRIEF DESCRIPTION OF THE DRAWINGS

The present invention will be understood and appreciated more fully from the following detailed description, taken in conjunction with the drawings in which:

FIGS. 6, 7, 8, 9, 10 and 11 are each a simplified illustration of a sensor module useful in a preferred embodiment of the present invention.

DETAILED DESCRIPTION OF PREFERRED EMBODIMENTS

Figure 1A:
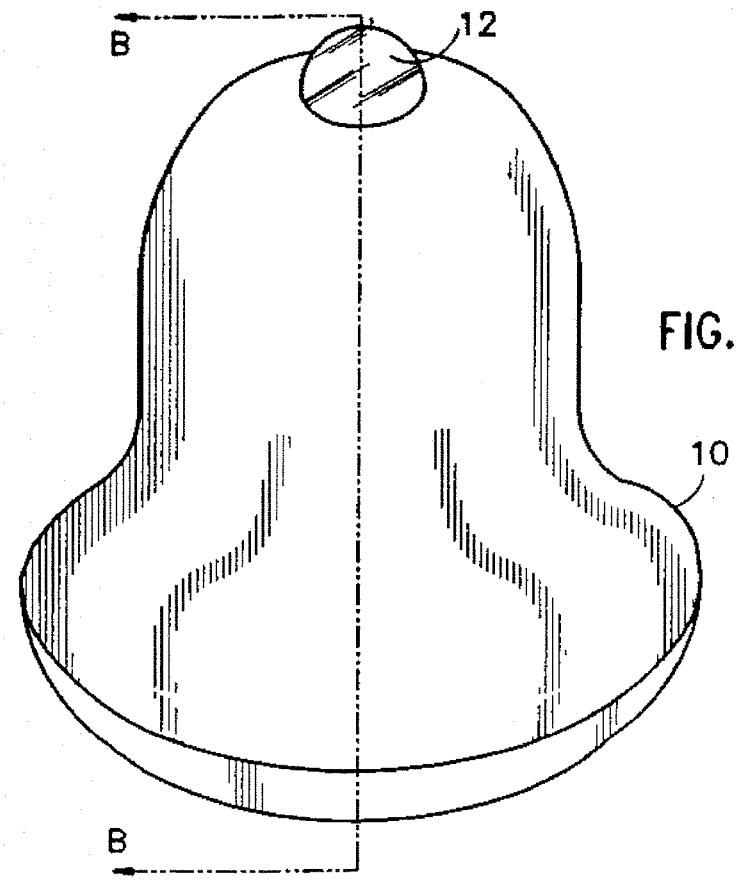
FIG. 1A is a pictorial illustration of earthquake alarm apparatus constructed and operative in accordance with a preferred embodiment of the present invention.
Figure 1B:
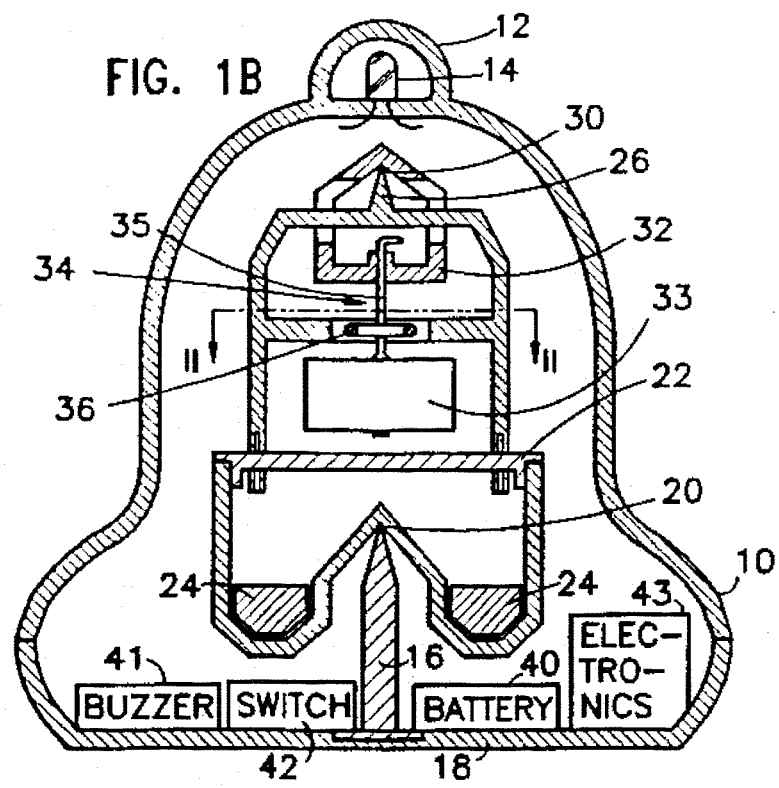
FIG. 1B is a sectional illustration of the apparatus of FIG. 1A, taken along lines B—B in FIG. 1A.

Reference is now made to FIGS. 1A and 1B, which illustrate earthquake alarm apparatus constructed and operative in accordance with a preferred embodiment of the present invention. The earthquake alarm apparatus comprises a housing 10, typically formed of plastic and having a transparent or translucent top portion 12, arranged to house a lamp 14 or other visual alarm indicator.

In the illustrated embodiment an upwardly directed pointed spike 16 is mounted on a base portion 18 of housing 10 such that the point of the spike 16 defines a first pivot location 20. Pivotably mounted onto the point of the spike 16 for pivotable motion about the first pivot location 20 is a first element 22, which may be made of one or more pieces and preferably has a first weight 24 associated therewith at a location lying below the first pivot location 20.

The first element 22 preferably similarly defines a second upwardly directed pointed spike 26 such that the point of the second spike 26 defines a second pivot location 30. Pivotably mounted onto the point of the spike 26 for pivotable motion about the second pivot location 30 is a second element 32, which may be made of one or more pieces and preferably has an earthquake actuated vibration sensor 34 associated therewith at a location lying below the second pivot location 30 but above the first pivot location 20. Earthquake actuated vibration sensor 34 is operative to sense earthquake actuated vibration of the second element 32 and to provide an output indication thereof.

Figure 2:
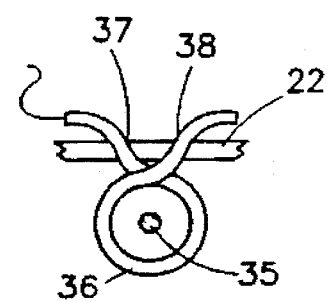
FIG. 2 is a sectional illustration of part of the apparatus of FIGS. 1A and 1B, taken along lines II—II in FIG. 1B.

In the illustrated embodiment, earthquake actuated vibration sensor 34 comprises a conductive sensor rod 35 which passes through a conductive sensor ring 36, as shown in FIGS. 1B and 2. Conductive sensor rod 35 is attached at its upper end to second element 32. A second weight 33 is attached to the lower end of conductive sensor rod 35.

Conductive sensor ring 36 is illustrated in FIG. 2 as a bent wire, the ends of which are press fit into locations 37 and 38 of first element 22. It is appreciated that many other methods of forming ring 36 and assembly thereof with first element 22 are possible.

The combined mass of the first element 22 and the first weight 24 is typically approximately 500–600 grams. The vertical distance between first pivot location 20 to the center of gravity of the first element 22 and weight 24 is typically approximately 40 mm.

The mass of the second element 32, second weight 33 and conductive sensor rod 35 is typically approximately 50–55 gm. The vertical distance between the second pivot location 30 and the center of gravity of the second element 32, second weight 33 and conductive sensor rod 35 is typically approximately 60–65 mm.

The vertical distance between the first pivot location 20 and the second pivot location 30 is typically approximately 80–100 mm.

The conductive sensor rod 35 is typically made of copper with a thin gold plate. The diameter of conductive sensor rod 35 is typically approximately 1–1.5 mm. The inner diameter of the conductive sensor ring 36 is typically approximately 3–4

It will be appreciated by one normally skilled in the art that the earthquake alarm apparatus 10 will be responsive to vibrations in the range of 0.1 to 10 Hz. It will also be appreciated that the earthquake alarm apparatus 10 will be responsive to earthquake induced vibrations that are generally in the frequency range from approximately 2 to 8 Hz. It will also be appreciated that the earthquake alarm apparatus 10 will be less responsive to non-earthquake induced vibrations such as sonic booms or nearby heavy traffic which are generally in the frequency range from 14 to 25 Hz.

Figure 3:
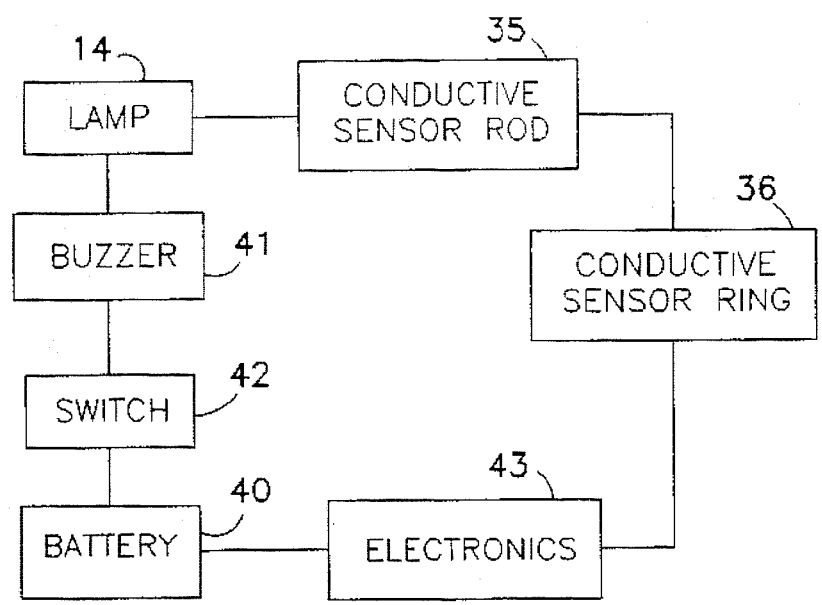
FIG. 3 is a simplified block diagram of electrical circuitry employed in the apparatus of FIGS. 1A and 1B.

Preferably alarm apparatus is provided, responsive to the output indication, for providing an audio and/or visual alarm indicating the occurrence of an earthquake. A simplified block diagram of electrical circuitry associated with alarm apparatus is shown in FIG. 3.

Conductive sensor rod 35 and conductive sensor ring 36 are electrically connected in series with lamp 14, battery 40, buzzer 41, switch 42 and electronics 43. Switch 42 is used to turn on the earthquake alarm apparatus. Upon the occurrence of an earthquake, vibrations cause rod 35 to contact ring 36, thereby completing the electrical circuit and operating buzzer 41 and lamp 14. Electronics 43 determines the duration of operation of buzzer 41 and the duration and type of illumination, such as steady or blinking, of lamp 14.

Figure 4:
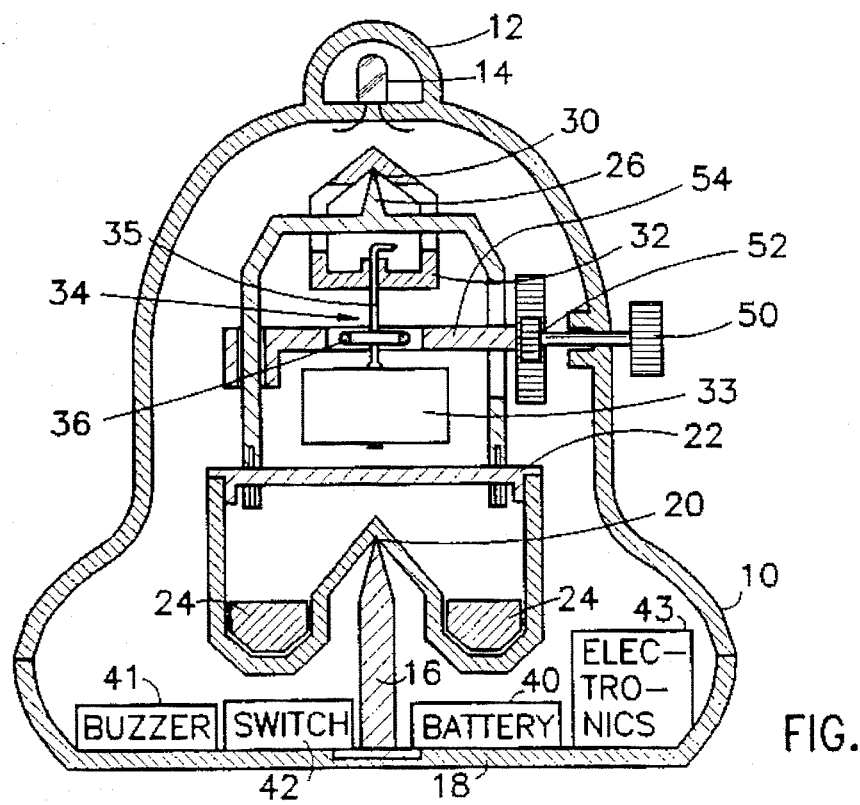
FIG. 4 is a sectional illustration of an alternative embodiment of the apparatus of FIGS. 1A–2.

Reference is now made to FIG. 4, which may be identical to the embodiment of FIGS. 1A, 1B and 2 but includes an adjustable sensitivity feature which will now be described. A user operable knob 50 operates a rack and pinion gear train 52 which raises or lowers an arm 54, thereby modifying the distance between conductive sensor ring 36 and second weight 33. Diminishing or increasing the distance between conductive sensor ring 36 and second weight 33 changes the required vibration amplitude needed to produce an alarm.

It will be appreciated that the backlash in rack and pinion gear 52 is sufficiently large so that the earthquake alarm apparatus of FIG. 4 will have substantially the same frequency response characteristics as the embodiment described hereinabove with reference to FIGS. 1A–2.

Figure 5:
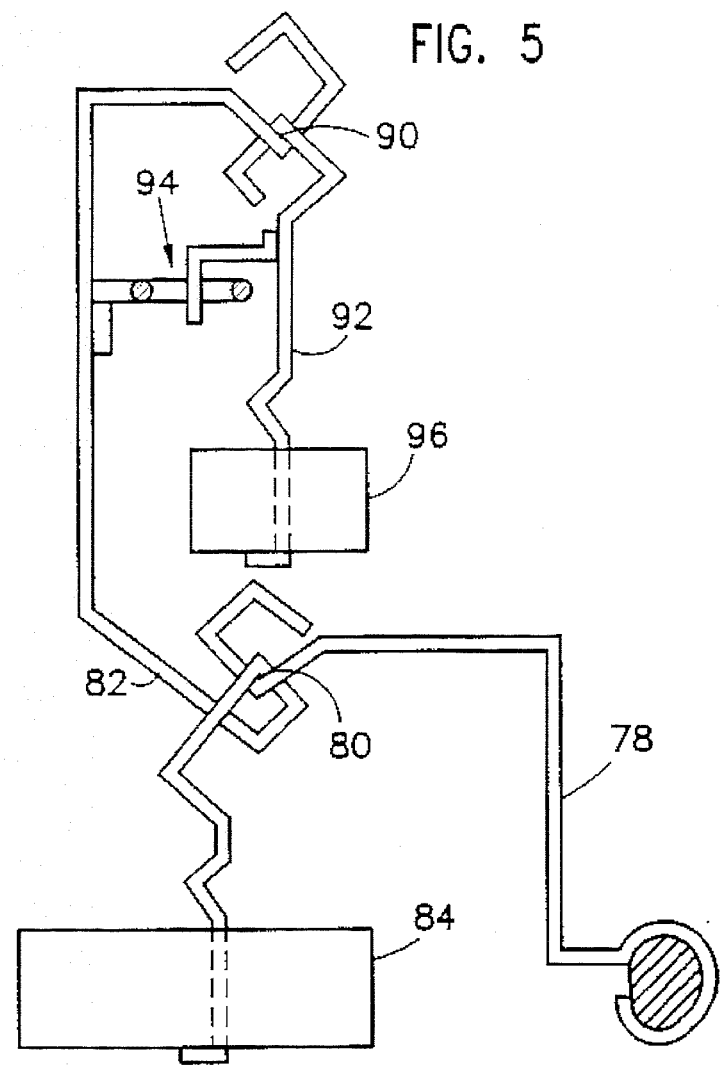
FIG. 5 is a simplified illustration of earthquake alarm apparatus constructed and operative in accordance with another preferred embodiment of the present invention.

Reference is now made to FIG. 5, which is a simplified illustration of earthquake alarm apparatus constructed and operative in accordance with another preferred embodiment of the present invention. The apparatus comprises a base element 78, which may be fixed to a wall or other suitable object and defines at a sharp bend therein a first pivot location 80.

Pivotably mounted onto base element 78 for pivotable motion about the first pivot location 80 is a first element 82, which may be made of one or more pieces and preferably has a first weight 84 associated therewith at a location lying below the first pivot location 80.

The first element 82 preferably similarly defines a second pivot location 90. Pivotably mounted for pivotable motion about the second pivot location 90 is a second element 92, which may be made of one or more pieces and preferably has an earthquake actuated vibration sensor 94 associated therewith at a location lying below the second pivot location 90 but above the first pivot location 80. Earthquake actuated vibration sensor 94 is operative to sense earthquake actuated vibration of the second element and to provide an output indication thereof. Second element 92 is preferably provided with a second weight 96 at a location below earthquake actuated vibration sensor 94.

It will be appreciated by one normally skilled in the art that the earthquake alarm apparatus of FIG. 5 will have substantially the same frequency response characteristics as the embodiment described hereinabove with reference to FIGS. 1A–2.

Preferably alarm apparatus is provided, responsive to the output indication, for providing an audio and/or visual alarm indicating the occurrence of an earthquake, substantially as illustrated and described hereinabove with reference to FIGS. 1A–3.

Reference is now made to FIGS. 6, 7, 8, 9, 10 and 11, which are each a simplified illustration of a sensor module useful in a preferred embodiment of the present invention. It is appreciated that the sensor module shown in each of FIGS. 6–11 simply replaces the earthquake actuated vibration sensor 34 of the embodiment illustrated in FIGS. 1A–3.

Figure 6:
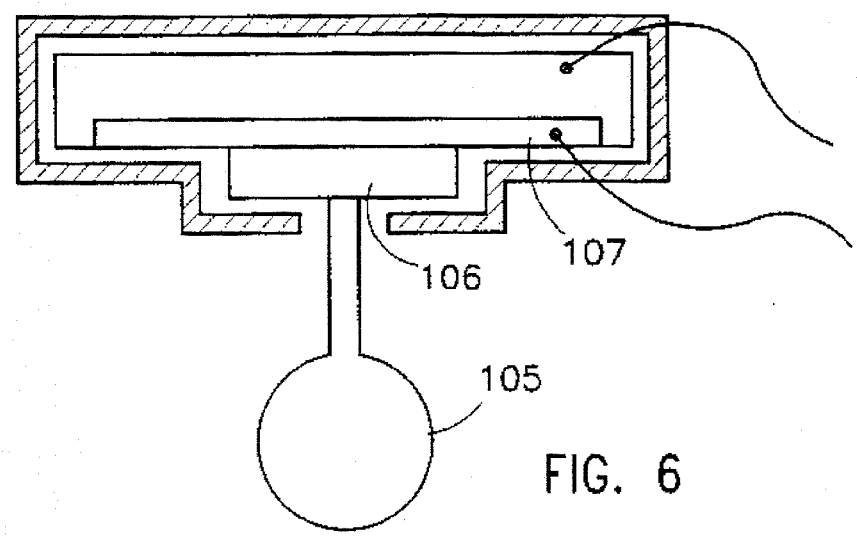

Referring now to FIG. 6, a weight 105 is fixed to a base 106 which is in mechanical communication with piezoelectric element 107. Piezoelectric element 107 is operative to produce electrical signals in response to mechanical strain caused by earthquake vibration induced displacement of weight 105 and base 106.

Figure 7:
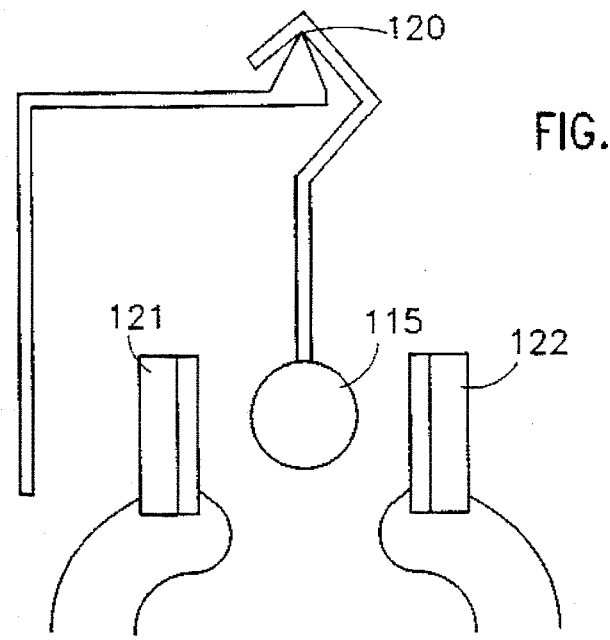

Reference is now made to FIG. 7 which illustrates a weight 115 suspended from pivot point 120 and operative to strike either of piezoelectric elements 121 and 122 upon the occurrence of an earthquake. Piezoelectric elements 121 and 122 convert the resulting mechanical strain to an electric signal.

Figure 8:
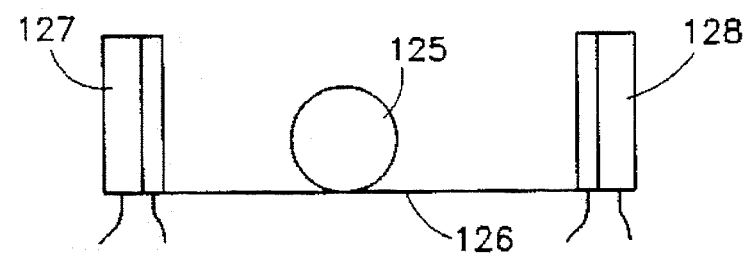

Reference is now made to FIG. 8 which illustrates a generally spherical weight 125 operative to roll on surface 126. Earthquake vibrations cause weight 125 to roll and strike either of sensors 127 or 128. Sensors 127 and 128 may be piezoelectric elements or contact microphones, which convert the strike into an electric signal.

Figure 9:
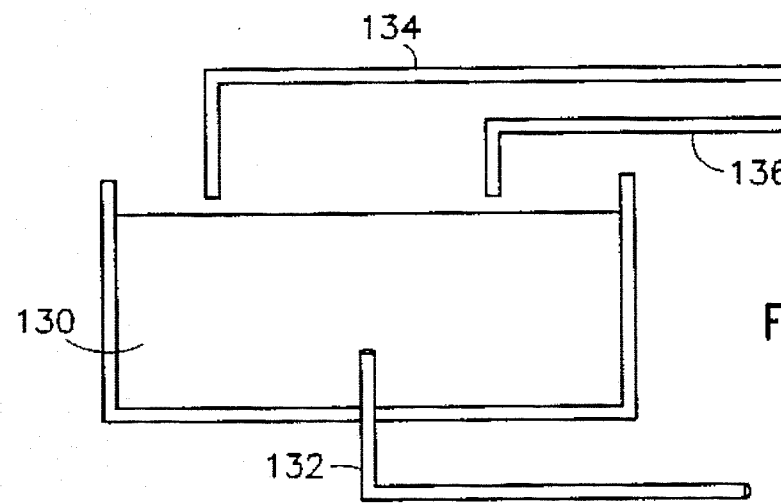

Reference is now made to FIG. 9 which illustrates a mercury bath 130 with an electrode 132 permanently submerged therein. Electrodes 134 and 136 are located above mercury bath 130 and initially are not in contact with the bath. Earthquake vibrations cause the mercury to contact either of the electrodes 134 or 136, thereby closing the alarm circuitry.

Reference is now made to FIG. 10 which illustrates a magnet 140 suspended from pivot point 142 and adjacent stationary coil 144. Earthquake vibration induced motion of magnet 140 with respect to coil 144 produces an electric signal.

Reference is now made to FIG. 11 which illustrates a similar arrangement to FIG. 10, except that in the embodiment illustrated in FIG. 11, coil 154 is suspended from pivot point 152 and magnet 150 is stationary.

It will be appreciated by persons skilled in the art that the present invention is not limited by what has been particularly shown and described hereinabove, but rather includes equivalents and variations thereto. The scope of the present invention is defined only by the claims which follow:

We claim:

1. An earthquake sensor comprising:

a base support, a first element pivotably supported onto said base support at a first pivot location, a second element pivotably supported onto said first element at a second location; and sensor apparatus operative to sense earthquake actuated vibration of said second element and to provide an output indication thereof, wherein said sensor apparatus is responsive to relative displacement of said first and second elements.

2. An earthquake sensor comprising:

a base support;

a first element pivotably supported onto said base support at a first pivot location;

a second element pivotably supported onto said first element at a second location; and sensor apparatus operative to sense earthquake actuated vibration of said second element and to provide an output indication thereof, wherein said sensor apparatus is located intermediate said first and second pivot locations.

3. An earthquake sensor comprising:

a base support, a first element pivotably supported onto said base support at a first pivot location, a second element pivotably supported onto said first element at a second pivot location; and sensor apparatus operative to sense earthquake actuated vibration of said second element and to provide an output indication thereof, wherein said sensor apparatus comprises piezoelectric apparatus.

4. An earthquake sensor comprising:

a base support, a first element pivotably supported onto said base support at a first pivot location, a second element pivotably supported onto said first element at a second pivot location; and sensor apparatus operative to sense earthquake actuated vibration of said second element and to provide an output indication thereof, wherein said sensor apparatus is responsive to frequencies induced in said base support in the range substantially between 0.1 Hz and 10 Hz to provide said output indication.

* * * * *